Patented Mar. 2, 1937

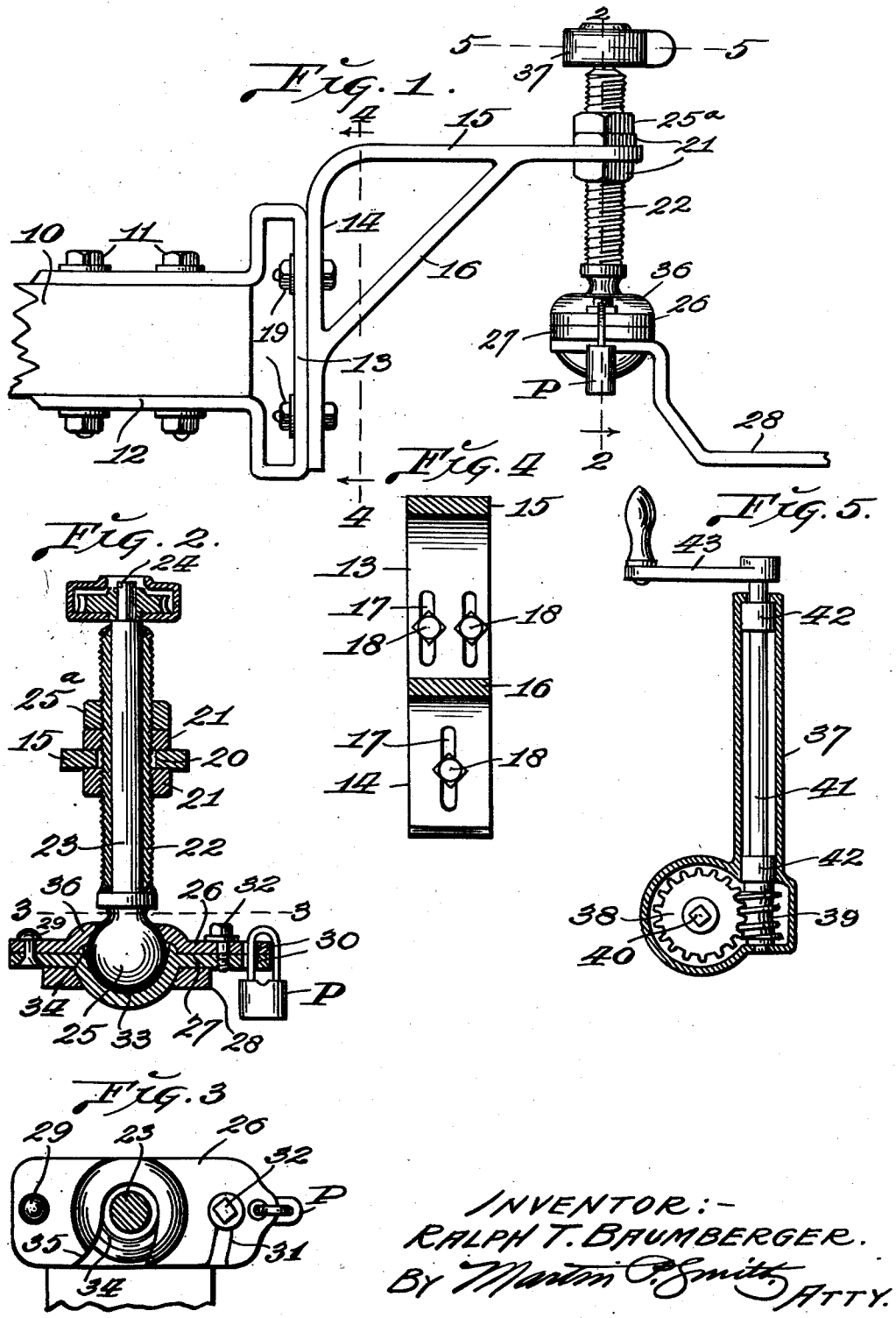

2,072,473

UNITED STATES PATENT OFFICE 2,072,473

HITCH FOR AUTOMOBILE TRAILERS

Ralph T. Baumberger, Los Angeles, Calif.

Application January 15, 1936, Serial No. 59,216

6 Claims. (Cl. 280—33.15)

My invention relates to a hitch for automobile trailers and has for its principal object, the provision of a relatively simple, strong and efficient hitch or coupling whereby a wheel supported body such as a trailer may be connected or coupled to the rear portion of a motor vehicle.

A further object of my invention is, to provide a hitch or coupling of the character referred to that may be easily and conveniently adjusted vertically so as to enable the trailer to be easily and conveniently coupled to or uncoupled from the motor vehicle without the necessity for jacking up the forward portion of the trailer and the construction of the hitch being such that the trailer is free to swing laterally in both directions relative to the motor vehicle as the latter and the trailer move in a forward direction.

Further objects of my invention are, to provide a hitch or coupling having a socket composed of two plates, one of which is mounted for pivotal movement on the other so as to conveniently engage and release a ball that is positioned within the socket and said plates being provided with means whereby they may be effectively locked to each other in closed position and further, to provide simple, convenient and efficient means for vertically adjusting the ball that is positioned in the socket between said plates.

A further object of my invention is, to generally improve upon and simplify the construction of the existing forms of devices for hitching or coupling trailers to motor vehicles.

With the foregoing and other objects in view my invention consists in certain novel features of construction and arrangements of parts that will be hereinafter more fully described and claimed and illustrated in the accompanying drawing in which:

Fig. 1 is a side elevational view of a hitch constructed in accordance with my invention.

Fig. 2 is an enlarged vertical section taken on the line 2—2 of Fig. 1.

Fig. 3 is a horizontal section taken on the line 3—3 of Fig. 2.

Fig. 4 is a vertical section taken on the line 4—4 of Fig. 1.

Fig. 5 is a horizontal section taken on the line 5—5 of Fig. 1.

Referring by numerals to the accompanying drawing which illustrates a preferred embodiment of my invention, 10 designates a tongue or beam that extends a short distance rearwardly from the base frame of a trailer or like vehicle and secured to the top and bottom of said tongue, preferably by means of bolts 11, are the horizontally disposed end portions of a metal strap 12. The intermediate portion 13 of this strap occupies a vertical position in front of the end of the tongue 10 and provides a base and point of attachment for a metal bracket. This bracket comprises a vertical leg 14 that occupies a position directly against the front face of member 13 and a horizontal leg 15 projects forwardly from the upper end of vertical leg 14.

An inclined brace 16 is disposed between the intermediate portions of the legs 14 and 15 and the ends of said brace are rigidly secured to said legs, preferably by welding.

Formed in the vertical leg 14 of the bracket, are vertically disposed slots 17 and passing therethrough and through apertures that are formed in the vertical member 13, are bolts 18, the threaded ends of which receive nuts 19.

The construction just described provides means whereby the bracket may be adjusted vertically upon member 13 and rigidly secured thereto after such adjustment.

Formed through the outer portion of the horizontal leg 15 of the bracket, is an aperture 20 and permanently secured to the upper and lower faces of the leg 15, immediately above and below this aperture are nuts 21.

Passing through these nuts 21, is an externally threaded tubular sleeve 22 and passing therethrough and rigidly secured thereto, preferably by welding, is a post 23. The upper end of post 23, which projects a short distance above the upper end of sleeve 22, is made square or non-circular as designated by 24.

A lock nut 25ª is mounted on the threaded sleeve 22 and when tightened against the upper one of the nuts 21, the sleeve and post 23 are securely locked against both rotary and vertical movement.

The lower end of post or standard 23 terminates in a ball 25 and a socket for the reception of said ball is formed between an upper plate 26 and a lower plate 27.

The lower one of these plates is permanently secured to an armor bracket 28 that projects a short distance rearwardly from the motor vehicle to which the trailer or other wheeled vehicle is connected.

At one end upper plate 26 is pivotally connected to lower plate 27, preferably by a pin or rivet 29 and the opposite ends of both plates are provided with apertures 30 which register when the plates are closed and to prevent the plates from being opened by unauthorized persons the shackle of a padlock P is inserted through the apertures 30.

To further secure the plates in closed position, upper plate 26 is provided with an arcuate slot 31 that projects inwardly from one edge of said plate and said slot being concentric with the axis formed by the rivet 29 and passing through said slot is the shank of a bolt or cap-screw 32, the threaded portion of which is screw-seated in lower plate 27.

When cap screw 32 is tightened, plate 26 is rigidly secured to plate 27 and thus the cap screw and the padlock provide double security against the plates becoming separated or opened.

The central portion of plate 27 is provided with a depression 33 that receives the lower portion of the ball 25 at the lower end of the post and formed on top of said plate around this depression is an upwardly presented rib or flange 34.

Formed in plate 26 and extending inwardly from one side edge thereof, is a short arcuate slot 35 that is concentric with the axis formed by the rivet 29 and the material in said plate surrounding the inner end of this slot, is extended upwardly to provide a lip or flange 36 that overlies the flange 34 and which also overlies the upper portion of ball 25.

Thus a substantially spherical socket for ball 25 is formed between the central portions of plates 26 and 27 and the opening through the flange 36 is of sufficient size to permit the post to swing freely in all directions for a limited distance in response to the movements of the automobile and trailer while the same are in motion.

To provide simple and convenient means for rotating the post comprising the parts 22 and 23 and move the same vertically in either direction when coupling or uncoupling the trailer, a wrench-like tool is provided and which tool is illustrated in horizontal section in Fig. 5. This tool comprises a tubular housing 37, one end of which is enlarged for the accommodation of a worm wheel 38 that is engaged by a worm 39. Worm wheel 38 is provided with a centrally arranged non-circular aperture 40 that receives the non-circular extension 24 at the upper end of the post and worm 39 is secured on one end of a shaft 41 that extends through housing 37.

Bushings or bearings 42 are provided for shaft 41 within the end portions of the housing 37 and the end of the shaft that projects beyond the end of housing 37 carries a crank handle 43.

In the use of my improved hinge, the vertical leg 14 of the bracket is rigidly secured in properly adjusted position to the vertical member 13 of strap 12 between bolts 19 and ball 25 and is positioned in the socket between plates 27 and 26 and plate 26 is then locked to plate 27 by tightening the cap screw 32 and applying the shackle of a padlock to the registering apertures 30.

The post comprising the parts 22 and 23 carrying the ball 25 at its lower end may be adjusted vertically by screwing said post upwardly or downwardly through nuts 21 and after such adjustment the post is secured by tightening the lock-nut 24.

Thus the proper point of connection between the motor vehicle and the trailer may be accurately regulated so that the trailer will be drawn by the vehicle to the best advantage.

During forward movement of the vehicle and trailer the latter may swing freely to either side and likewise may rock laterally due to the ball and socket connection between the brackets 15 and 28.

The post comprising the parts 22 and 23 may be conveniently raised or lowered by the application of the wrench-like member to the non-circular upper end of member 23 which engages in the corresponding opening 40 in worm wheel 38.

When the wrench is thus applied, the operator grasps tubular housings 37 in one hand and with the other hand engages crank handle 43 and rotates shaft 41.

The engagement of worm 39 with the worm wheel 38 rotates the post comprising the parts 22 and 23 and the threaded engagement between the sleeve of the post and the nuts 21 moves said post upwardly or downwardly.

This method of raising or lowering the post affords convenience in effecting the coupling and uncoupling operations.

Thus it will be seen that I have provided a hitch for automobile trailers that is relatively simple in construction, inexpensive of manufacture and very effective in performing the functions for which it is intended.

It will be understood that minor changes in the size, form, and construction of the various parts of my improved hitch for automobile trailers may be made and substituted for those herein shown and described without departing from the spirit of the invention, the scope of which is set forth in the appended claims.

I claim as my invention:

1. In a hitch for automobile trailers, a bracket, a post mounted for vertical adjustment in said bracket, a ball carried by the lower end of said post, a plate provided with a socket for the reception of said ball, means for connecting said plate to a vehicle a plate overlying said first-mentioned plate and pivotally connected to one end thereof so as to swing laterally thereon, said pivotally mounted plate being provided with a slot for the reception of the lower portion of said post and means for locking the two plates to each other.

2. In a hitch for automobile trailers, a bracket, a post mounted for vertical adjustment in said bracket, a ball carried by the lower end of said post, a plate provided with a socket for the reception of said ball, means for connecting said plate to a vehicle a second plate pivotally connected to the end of the plate having the socket and adapted to swing laterally relative thereto, said pivoted plate being provided with a slot for the reception of the lower portion of said post and a flange formed on said pivoted plate and surrounding the slot therein, which flange overlies the ball positioned in said socket.

3. In a hitch for automobile trailers, the combination with a tongue projecting from the lower portion of the end of the trailer, a bracket, means for securing said bracket to said tongue in differently adjusted vertical positions, a post mounted for vertical adjustment in said bracket, a ball on the lower end of said post, a plate provided with a socket for the reception of said ball a second plate pivotally connected to one end of the socket plate so as to swing laterally with respect thereto, said second mentioned plate having a slot for the accommodation of the lower end of the post, a flange formed on said second-mentioned plate and projecting upwardly and inwardly along the edge of the slot therein, so as to overlie the upper portion of the ball positioned in said socket.

4. In a hitch for automobile trailers, the combination with a tongue projecting from the lower portion of the end of a trailer, of a bracket, means for securing said bracket to said tongue in differently adjusted positions, a post mounted for vertical adjustment in said bracket, a plate provided with a socket for the reception of said ball, means for connecting said plate to a vehicle, a second plate arranged on top of said first-mentioned plate and pivotally connected to one end thereof, so as to swing laterally with respect thereto, said second-mentioned plate having a slot for the accommodation of the lower portion of said post, a flange formed on said second-mentioned plate and projecting upwardly and inwardly around the slot therein, which flange is adapted to overlie the upper portion of said ball when the same is positioned in said socket and means for locking the free end of said pivoted plate to the socket plate.

5. In a hitch for automobile trailers, the combination with a tongue projecting from the lower portion of the end of the trailer, of a bracket, means for securing said bracket to said tongue in differently adjusted vertical positions, a vertically disposed post screw-seated in said bracket, means for securing said post in differently adjusted positions, a ball on the lower end of said post, a plate provided with a socket for the reception of the lower portion of said ball, means for connecting said plate to a vehicle, a second plate arranged on top of the socket plate and pivotally connected to one end thereof so as to swing laterally relative thereto, said second-mentioned plate provided with a slot for the accommodation of the lower portion of the post, a flange formed on said second-mentioned plate, which flange projects upwardly and inwardly from the edge of said slot so as to overlie the upper portion of the ball when positioned in said socket and means for securing the free end of said pivoted plate to said socket plate.

6. In a hitch for automobile trailers, the combination with a tongue projecting from the lower portion of the end of the trailer, of a bracket, means for securing said bracket to said tongue in differently adjusted vertical positions, a vertically disposed post screw-seated in said bracket, means for securing said post in differently adjusted positions, means mounted on the upper end of said post for imparting rotary movement thereto, a ball on the lower end of said post, a plate provided with a socket for the reception of the lower portion of said ball, means for connecting said plate to a vehicle, a second plate arranged on top of the socket plate and pivotally connected to one end thereof so as to swing laterally relative thereto, said second-mentioned plate provided with a slot for the accommodation of the lower portion of the post, a flange formed on said second-mentioned plate, which flange projects upwardly and inwardly from the edge of said slot so as to overlie the upper portion of the ball when positioned in said socket and means for securing the free end of said pivoted plate to said socket plate.

RALPH T. BAUMBERGER.